United States Patent [19]

Connelly

[11] 4,337,049
[45] Jun. 29, 1982

[54] METHOD AND SYSTEM FOR AUTOMATED TRAINING OF MANUAL SKILLS

[76] Inventor: Edward M. Connelly, 1909 Hull Rd., Vienna, Va. 22180

[21] Appl. No.: 223,847

[22] Filed: Jan. 9, 1981

[51] Int. Cl.³ .............................................. A63B 21/00
[52] U.S. Cl. .................................................... 434/247
[58] Field of Search ............... 434/247, 248, 249, 250, 434/251, 252, 253, 254, 255, 256, 257, 258, 236

[56] References Cited

U.S. PATENT DOCUMENTS

| | | | |
|---|---|---|---|
| 2,737,432 | 3/1956 | Jenks | 346/44 |
| 2,830,556 | 4/1958 | Grams | 119/27 |
| 3,145,484 | 8/1964 | Bayley | |
| 3,210,747 | 10/1965 | Clynes | 340/206 |
| 3,270,564 | 9/1966 | Evans | 73/432 |
| 3,301,561 | 1/1967 | Kaiser | 273/186 |
| 3,350,944 | 11/1967 | De Michele | 73/398 |
| 3,408,750 | 11/1968 | McCollough et al. | |
| 3,419,732 | 12/1968 | Lane | 307/116 |
| 3,466,761 | 9/1969 | Stinchcomb | |
| 3,492,582 | 1/1970 | Heywood | 325/66 |
| 3,572,316 | 3/1971 | Vogelman et al. | 128/2.05 |
| 3,589,337 | 6/1971 | Doss | 119/29 |
| 3,592,195 | 7/1972 | Wagenen et al. | 128/295 |
| 3,644,919 | 2/1972 | Mathauser | 340/279 |
| 3,717,857 | 2/1973 | Evans | 340/177 R |
| 3,748,750 | 7/1973 | Vieneister | 434/236 |
| 3,777,712 | 12/1973 | Gardner et al. | 119/29 |
| 3,792,863 | 2/1974 | Evans | 273/186 A |
| 3,797,010 | 3/1974 | Adler et al. | 340/323 |
| 3,808,707 | 5/1974 | Fink | |
| 3,815,922 | 6/1974 | Brainaro | 273/184 B |
| 3,820,133 | 6/1974 | Adorney et al. | 354/60 |
| 3,846,704 | 11/1974 | Bessette | 325/66 |
| 3,861,688 | 1/1975 | Butler | 273/183 B |
| 3,874,339 | 4/1975 | Coulbourn | 119/29 |
| 3,876,212 | 4/1975 | Oppenheimer | 273/186 R |
| 3,895,366 | 7/1975 | Morris | 340/207 R |
| 3,918,073 | 11/1975 | Henderson et al. | 354/120 |
| 3,929,335 | 12/1975 | Malick | 272/257 R |
| 3,986,136 | 10/1976 | Hurlburt | 434/236 X |
| 4,137,556 | 1/1979 | Haas et al. | 364/410 |

FOREIGN PATENT DOCUMENTS 723648  1/1978  U.S.S.R. ............................. 434/236

OTHER PUBLICATIONS

Edward M. Connelly et al., *Computer–Aided Generation of Performance Measures for Man–Machine Systems*, Oct. 1974.

E. M. Connelly et al., *Continuous Performance Measurement in Flight Systems*, May 1975.

Clyde N. Herrick, *Color Television: Theory and Servicing*, pp. 122-127.

*Primary Examiner*—Harland S. Skogquist
*Attorney, Agent, or Firm*—Joseph G. Seeber

[57] ABSTRACT

A method and system for automated training of a subject in manual skills, wherein body motion is measured so as to derive a set of motion variables, the motion variables are compared to a reference motion to derive a motion error value, the motion error value is compared to a threshold error value corresponding inversely to the proficiency level of the subject, and a training signal is provided to the subject whenever the motion error value exceeds the threshold error value. One embodiment of the inventive system comprises a plurality of lamps mounted on the subject, first and second cameras for scanning the subject in accordance with first and second reference systems, respectively, a selection circuit for selecting first and second motion data derived by the first and second cameras, a processor for processing the selected first and second motion data to determine a variation between the performance of the subject and a performance measure standard, and a training signal generator for providing a training signal to the subject whenever the variation exceeds a preset threshold level. In an analog version of this embodiment, motion data relative to each respective reference system is derived in sequence in analog form; in a digital version of this embodiment, motion data is derived concurrently, and in digital form, for each reference system. In a further embodiment of the inventive system, a plurality of rotating cylinders having light sources therein direct light toward the subject, on which a plurality of photosensors are mounted. Further inventive features include a self-calibration technique.

15 Claims, 7 Drawing Figures

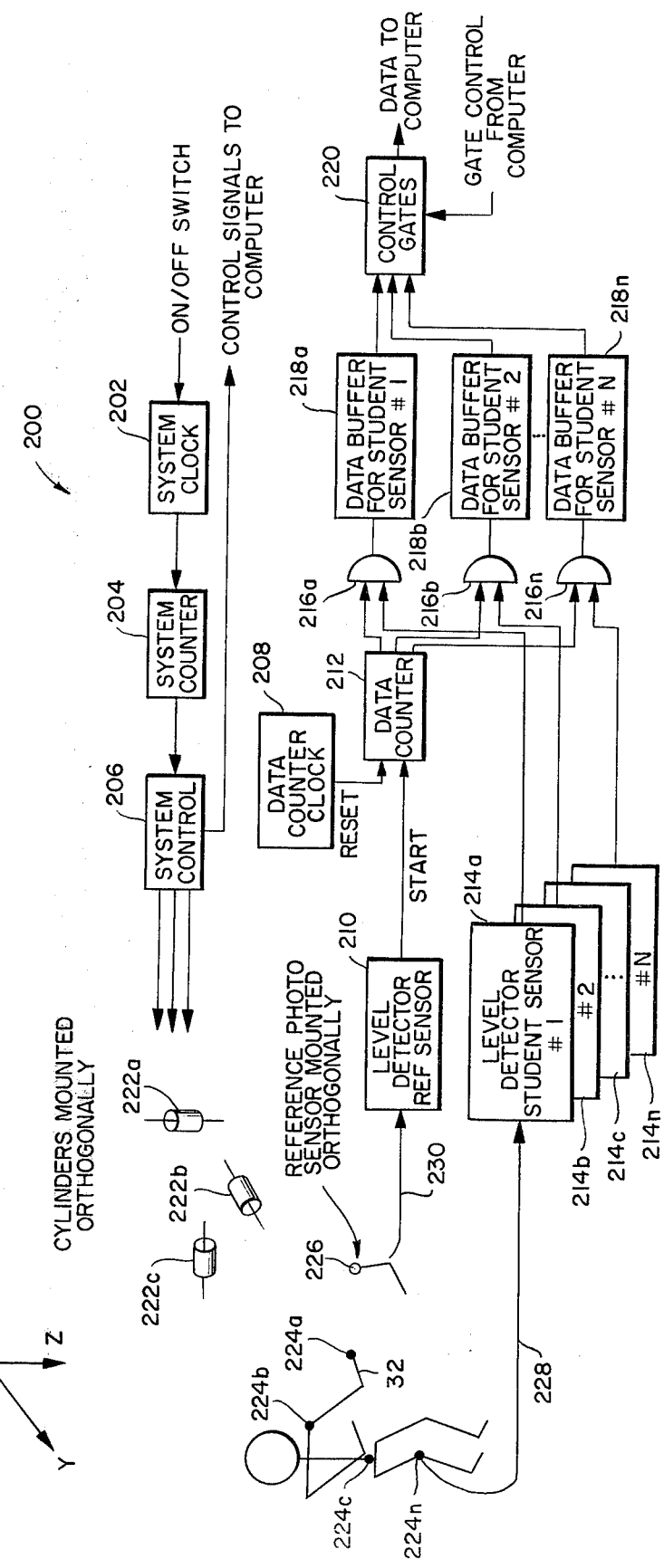

METHOD AND SYSTEM FOR AUTOMATED TRAINING OF MANUAL SKILLS

BACKGROUND OF THE INVENTION

1. Field of the Invention

The present invention relates to a method and system for automated training of manual skills. More specifically, the invention relates to a method and system wherein body motion of a subject being trained is measured so as to derive a set of motion variables, the motion variables are compared to a reference motion to derive a motion error value, the motion error value is compared to a threshold error value corresponding inversely to the proficiency level of the subject, and a training signal is provided to the subject whenever the motion error value exceeds the threshold error value.

Manual tasks are defined as all tasks where the human being inputs some type of control and obtains feedback information as to the result of that control effort. Included in the category of manual tasks are tasks performed with the arms, hands, or other limbs. Also included are tasks performed with the aid of machines or tools to provide mechanical advantage, accuracy, speed, force, or stability. Manual tasks are found in everyday life such as assembling items, placing objects or shelves, opening doors, etc.; in sports, such as rolling bowling balls, shooting arrows, hitting golf balls, shooting basketballs, throwing footballs, etc.; and in work, such as operating folklifts, hammering nails, operating machines, and so forth. Manual tasks are also important in military operations—a few examples are aiming rifles or other weapons, flying aircraft, and controlling ships. The list of examples of manual tasks, for practical purposes, is endless.

A manual task consists of a set of parallel of sequential actions intended to produce a desired result. Evaluation of a manual effort typically consists of an evaluation of the net result of the effort. For example, evaluation of a dart throw is accomplished by observing how far the dart is displaced from the desired location when it comes to rest. Evaluation of a bowling roll might be measured in terms of the number of pins remaining or whether or not the bowling ball hit the intended pin. This type of measure is termed a "summary measure" since it summarizes the result of the total effort in one measurement.

A summary measure is available only after the task is completed and often only after some time has elapsed. For example, for a golf stroke, the measure of performance might be the distance from the pin to the ball after it comes to rest; however, the flight time of the ball is such that information for evaluation is not available until well after the manual effort has been completed. For some manual tasks, performance information may be available a short time after the task has been completed and, for others, information is available only after a very long time after the task is completed.

As stated above, a summary evaluation of a task necessarily combines the effect of all task component actions, and provides the evaluation only after all component actions are complete. This lack of specificity and the time delay prohibit rapid acquisition of manual skill. If the effect on task performance of each component action is evaluated and that performance information fed back to the performer, each component action can be learned as in entity. This specificity promotes rapid training.

Of at least equal importance to training efficiency is the time delay between the completion of a component action and its evaluation. Numerous studies (for example, the work described by I. M. Bilodeau, *Information Feedback,* New York: Academic Press, 1966, Chapter 6) have shown that the greater the delay before evaluation information is fed back to the trainee, the lower the learning rate. If a continuous and instantaneous evaluation of performance is available, performance of each component action can be evaluated during the performance and immediately upon its completion. This information, properly fed back to the trainee, eliminates both the non-specificity and time delay problems, and permits rapid learning of the skills required to perform the manual task.

There are several problems to be considered in the presentation of performance information to the trainee. The performer, a human being, can receive and use only a limited amount of information in a given time period. Selection of only important information and modulation of the information rate to match the trainee's useful receiving rate are required. Another problem is that, if performance information is not fed back correctly, the performer may learn to rely on the feedback information to perform, rather than use it to learn to perform. A still further problem is that the human sensory channel used to receive the performance evaluation information must be selected in conjunction with considering the information as imposed by the component action itself. Solutions to these problems are embedded in the automated training techniques used and, therefore, are best discussed after the techniques have been described.

To summarize, the purpose of the presently disclosed invention is to provide rapid training of skills for manual tasks to a high level of task performance. A key feature of the invention is that performance is evaluated continuously, and that performance information can be presented to the performer in several ways, including immediate feedback to the performer or to the coach. The evaluation information allows the performer to identify both correct and incorrect component actions, and possibly to correct the action while it is being performed.

The primary application of the present invention is improvement in the speed of learning manual control skills, and improvement in the level and consistency of the performance attained. An additional application relates to the continuous testing of operators, such as machinery operators, so that performance can be evaluated continuously in order to determine the need for retraining to maintain performance, to improve safety, or to change motivation factors.

In order to distinguish the automated training techniques described herein from other training techniques, it is useful to recognize that the method is composed of two parts: (1) the continuous measurement and processing of measure signals to provide a continuous performance evaluation; and (2) the feedback techniques used to direct performance information to the performer. It is necessary, as is shown below, to modulate the amount of information fed back to the performer, depending on the task and his skill level because he can absorb and use only a limited amount of information during any time interval.

2. Description of Prior Art

There has been considerable work accomplished in a related field known by a variety of terms, the major term being "adaptive training." This approach to training of manual skills was pioneered by Kelly et al ("A Manual for Adaptive Techniques," *Final Report*, August 1970, AD-711-985), and has been used by many others to implement automatic training systems. Essentially, the technique is to start the trainee on a very simple problem, and, depending on how well he performs on that problem, the trainee is given successively more difficult tasks to perform. Adaptive logic determines the degree of difficulty of the next problem as a function of the student's immediate past performance. For example, should his performance degrade, the adaptive logic decides whether he should receive an easier task or receive additional tasks at the present problem difficulty level. Typically, the trainee is given tasks which are successively more difficult until he reaches the criterion performance, whereupon the program is terminated.

There are several well-known advantages to this type of training. One is that the training tasks are adapted to the trainee's performance so that he is not over-loaded with very difficult and perhaps unmanageable tasks in the beginning. Also, as Kelly has stated, the technique is especially applicable to research of human control capability, since the adaptive nature of the equipment forces the system (man and machine) to a region where performance is limited. In this way, the researcher is not burdened with collecting data in situations where high performance is easy, but rather collects data where the human being is stressed to provide high performance.

However, there are several difficulties with the adaptive training method. The major difficulty is that the control problem is modified by either increasing or decreasing task disturbances, or by changing the properties of the task itself. These modifications change the control task from the initial one to the final one, and thus the trainee has the problem of learning to perform a variety of tasks and to operate with a variety of disturbances during the training program. These "interim" tasks and disturbances may not correspond to any of the real life problems the operator may encounter after training is completed.

Another difficulty, which is related to the first, is that the trainee is not given continuous performance information, and even if he were, he would not be able to apply it effectively because of the change (typically a step-wise change) in control problem environment. Thus, with this system, the trainee may learn basic skills, but is prevented from tackling the real problem directly. The invention described here is distinctive in that it employs fixed tasks and disturbance profiles, but varies criterion performance as a function of performance achievement by the trainee.

There have been numerous studies where knowledge-of-results (KR) has been used to improve both the learning rate and level of performance when training is completed. Of interest here is the technique known as "biofeedback," (Roberts et al, "Voluntary Control of Skin Temperature: Unilateral Changes Using Hypnosis and Feedback," *Journal of Abnormal Psychology*, Vol. 28, No. 1, 1973). With this technique, a signal is fed back when performance (which, in some studies, is controlled by an involuntary response) is out of tolerance. Yet experimental results show that the feedback does result in effective training of the control response desired. The unfortunate property of this technique is that the feedback is triggered by the effect of a control error (which occurs after the error) instead of being triggered by the error itself. However, results of this research suggest that a very simple form of performance feedback, a binary out-of-tolerance signal, can indeed be used to control specific responses.

SUMMARY OF THE INVENTION

According to the present invention, there are provided a method and system for automated training of a subject in the performance of manual skills. More specifically, the invention relates to a method and system wherein body motion is measured so as to derive a set of motion variables, the motion variables are compared to a reference motion to derive a motion error value, the motion error value is compared to a threshold error value (corresponding inversely to the proficiency level of the subject), and a training signal is provided to the subject whenever the motion error value exceeds the threshold error value. However, before the invention is described in more detail, it is useful to describe the nature of manual tasks.

Performance of a manual task is not simply the exact repetition of a unique sequence of body motions leading to a desired result. In some manual tasks, such as in certain sports, the performer would like to be able to provide the exact repetition of the unique sequence of motions that was successful previously, in the belief that the capability (skill) is the only skill required to perform in a superior manner. The performer may actually visualize the task as requiring a fixed sequence of motions, and may organize his training to that end. Further, the design of many training devices is such as to teach the performer to merely reproduce a fixed sequence of motions; the existence of such devices perpetuates the idea that a single unique sequence of motions is the only, or even the major, skill requirement.

Instead, the performer must learn a family of motions that provides the desired result. A family of motions is required because of the varying factors, both external and internal to the performer, that influence the desired result. For example, internal factors can be classified as informational (i.e., data about performance of previous attempts of the task) and physical (i.e., the effect of recent usage or lack of usage of the body in performing the task of interest, or other tasks). Muscle fatigue is an example of an internal factor in the latter category. Examples of external factors include the effect of an opponent's play and different starting positions in sports tasks, and variations of materials in industrial processes.

Variations can occur during the performance of the task itself. Consider a golf swing; as the swing is started, the performer can realize that the back swing was not as full as desired and must in some way adjust the remainder of the swing. A basketball player often has to adjust his shot due to the defensive play of his opponent. There are many other examples of manual tasks where adjustment is required during the performance of the task.

The requirement that a performer must learn a family of motions that provide the desired result imposes specific requirements on the performance measurement system. A family of motions is not simply a set of independent motions that are similar but have different starting and perhaps different ending conditions. Instead, a family of motions is a set of constituent elementary motions. Any given performance involves a sequence of some members of that set. A second performance may use some members used in the first performance combined with others not used in the first performance. A third performance may use members used in the first and second performances combined with other members, and so forth. Yet, all of these performances may be considered successful in that the objective was achieved; i.e., there are many ways to be successful. Based on this concept, the performer must learn correct response(s) at each step of the performance and, of at least equal importance, must learn the consequences of deviations from a correct response at each step of the performance. Consequently, the performance measurement system required to facilitate learning of "the family of motions" must detect deviation from correct motions at each step of the performance (i.e., continuously detect any deviations), and must evaluate the consequences of those deviations. The consequences of the deviations must be the effect of the deviations on the prospects of satisfying the task objective.

A manual task is performed to accomplish a specified end objective, and a measure of how well that end objective is accomplished is called a summary measure. As an example, a measure of how well an arrow is shot is the distance of the arrow from its objective when the arrow comes to rest. The summary score for a track event is the time the runner requires from start to finish. Some summary scores are a function of performance accrued during the task. For example, evaluation of an aircraft landing is not only a function of conditions at touch down, but also is a function of performance during the approach and along the glide path. The characteristic of a summary measure is that its value is available only when the task has been completed. Thus, while the summary measure is the basic measure on which other measures are derived, the summary measure value is available only after the task is complete. This causes a delay between time of performance and time of evaluation of performance, as mentioned previously. Such a delay impedes skill learning.

Often, a tolerance in the form of an objective criterion is placed on the summary measure value. Examples of such objective criteria in sports activity are the bulls eye for archery and other shooting, and the diameter of a basket hoop for basketball. If the performer can statisfy the criterion consistently, his performance of the task is satisfactory. In other cases, there may not be a tolerance criterion on the summary measure. This can occur in track and field events where the performer attempts to optimize his performance; but, even in these cases, a specific objective criterion might be sought for a particular event. For example, a criterion might be to set a record or achieve a specific improvement over one's previous performance.

However, even though performance may be scored by a summary measure, the task is performed on a moment-by-moment basis. Thus as stated previously, the performer must learn the correct motion at each step of the task (i.e., the motion that will satisfy the objective criterion). Also, the performer must learn the effect of motion errors on the summary measure. Some errors are not serious in that they do not result in failure to satisfy the objective criterion, while other errors are more serious and result in failure to satisfy the criterion. A measure which continuously (or at frequent time intervals) detects motion errors and evaluates the severity of those errors is called a system performance measure (SPM).

More specifically, an SPM is a mathematical function that relates the effect of each performer motion to the summary performance measure selected. With the SPM, the effect on task summary performance of the way in which each portion of the task is performed can be assessed. The effect of performer motion cannot be expected to be uniform over all task steps. The SPM function reflects these sensitivity variations. An important property of the SPM function is its ability to detect "the many ways" in which both good and poor performance can be achieved.

The SPM function embodies performer motions (as a function of task state variables) leading to superior performance and, in addition, the function embodies the effect of deviations from those inputs on summary performance.

Since the SPM function must permit comparison of the actual motion to a reference motion which is known to lead to superior performance, and since the comparison must be made at each increment of time (or over short intervals of time), the reference motion must be a function of the present motion state. In other words, there is a reference motion (i.e., best incremental motion), given the present situation (state), independent of how the performer arrived at the present situation. The reference motion cannot be represented by algebraic functions of time (such as shoulder, elbow, and wrist angles as functions of time) which extend from the beginning of the act to the end of the act because, if that were true, then, even though the actual and reference motions may start in the same state, any deviation by the actual motion would prohibit the comparison. Instead, the reference motion must be represented as the desired incremental motion, given the present system situation (state). Therefore, the reference motion must be represented by a set of differential (or difference) equations as a function of the motion state.

Since the reference motion is described by a set of differential equations, there exists an implicit path from each possible state, including the initial state, to a terminal state (or set of states). This implicit reference path is the solution of the differential equations from the present motion state to the terminal state (s).

For the same reason, the equations providing the significance-of-deviation information must be differential equations. SPMs serve several functions: (1) they provide reference performer motion and significance-of-control error information, and thus identify critical task steps; (2) they provide a sensitive, comprehensive, and valid performance measure for the task and task steps; (3) they can be developed empirically in an automatic manner, can be developed for each individual, and do not require a detailed task analysis; (4) analysis of the SPM's functional structure reveals critical task steps where accurate control is essential; and (5) SPMs permit rapid assessment of performance and provide a basis for KOR (knowledge of results) feedback for training enhancement.

The present invention relates to an automated training system which provides training signals to the student to improve or maintain performance. The system uses measurement of position, velocity, and acceleration of body components such as the arms, legs, and torso, and equipment such as a tennis racquet and a golf club. Training feedback informs the student as to his present body motion and equipment errors, and the feedback is weighted according to the severity of the errors with respect to accomplishing the end objective of the entire task. Finally, modulation of the performance feedback is provided to control the amount of information fed back per time interval. By means of this modulation, the amount of training feedback is limited in order to match the student's ability to receive and use the training information. Each of the system functions is described in more detail below.

As will be described in more detail below, the inventive system for automated training of a subject in manual skills comprises: at least one lamp mounted on the subject and actuable to a lighted condition; a first camera for scanning the subject in accordance with a first reference system to develop first motion data relative to the first reference system; a second camera for scanning the subject in accordance with a second reference system to develop second motion data relative to the second reference system; a selection circuit for alternatively selecting the first motion data and second motion data, respectively; a processor for processing the selected first and second motion data to determine a system performance measure of the subject, and for comparing the system performance measures of the subject to a performance measure standard to develop a variation for error therebetween; and a training signal generator responsive to a preset threshold level for sending a training signal to the subject whenever the variation or error exceeds the preset threshold level. In a preferred embodiment of the inventive system, a plurality of lamps are mounted on various portions of the body of the subject, and two television cameras view the subject from different perspectives in accordance with respective coordinate systems (for example, X-Y and Y-Z). The resulting respective video signals are then selectively provided to a processor wherein they are processed in accordance with conventional techniques in order to develop motion data, and thus a system performance measure (SPM) relative to the subject. The SPM is compared to a performance measure standard in order to develop a variation or error therebetween. Then, a training signal generator sends a training signal to the subject whenever the variation or error exceeds a preset threshold level. This preset threshold level is adjusted (lowered as the student's performance improves) to modulate the feedback to the student, i.e., to assist in continued performance improvement.

As will be seen in the detailed description below, the aforementioned embodiment of the invention may be implemented in accordance with analog techniques, whereby the analog video signals are selectively provided to a converter, converted to digital form, then provided to the processor, or may be implemented in accordance with digital techniques, whereby the analog video signals are utilized to implement a digital counting operation, with the resulting digital count values being selectively provided to the processor.

In accordance with another aspect of the present invention, the system is automatically and periodically calibrated by automatically and periodically actuating a calibration or reference lamp (located in the vicinity of the subject) to the lighted condition, so as to provide the system with a known, fixed point of reference with respect to which motion data can be subsequently obtained.

In accordance with a further embodiment of the present invention, a plurality of rotating cylinders, having light sources located therein and provided with slits, provide moving elongated light beams. Sensors mounted on the subject receive and detect the moving light beams, and provide corresponding sensor signals to the processor by means of a selection procedure. In accordance with known techniques, the processor utilizes the sensor indications of detection of the moving light beams to determine the position of the sensors, thus providing a desired motion data relating to the movement of the subject. As is the case in the other embodiments, the motion data comprising a system performance measure is compared to a performance measure standard to develop a variation or error therebetween, and a training signal is generated whenever the variation or error exceeds a present threshold level, which is adjustable as stated above.

Thus, it is an object of the present invention to provide a method and system for automated training of a subject in manual skills.

It is an additional object of the present invention to provide a method and system wherein body motion is measured so as to derive motion data, the motion data is compared to a reference motion to derive a motion error value, a motion error value is compared to a threshold value corresponding inversely to the proficiency level of the subject, and a training signal is provided to the subject whenever the motion error value exceeds the threshold error value.

It is an additional object of the present invention to provide a system wherein a plurality of cameras or other scanning means are employed to derive analog signals corresponding to motion data relating to movement of the subject, such analog signals being converted to digital form and provided to a processor for processing and subsequent development of a training signal whenever appropriate.

It is an additional object of the present invention to provide a system wherein a plurality of cameras or other scanning means are utilized to develop video signals which are subsequently converted to digital form, the resulting digital signals being selectively provided to a processor means for subsequent processing and resultant provision of a training signal to a subject whenever appropriate.

It is an additional object of the present invention to provide a system for automated training of a subject in manual skills, which system has the capability of automatic and periodic calibration.

It is a further object of the present invention to provide a system for automated training of a subject in manual skills, wherein moving light beams are generated in correspondence to orthogonal reference planes, such moving light beams being sensed by sensors mounted on the subject.

The above and other objects that will hereinafter appear and the nature of the invention will be more clearly understood by reference to the following description, the appended claims, and the accompanying drawings.

BRIEF DESCRIPTION OF DRAWINGS

FIG. 7 is a block diagram of a third embodiment of the present invention.

DETAILED DESCRIPTION

The description of the present invention will now be more fully described with reference to FIG. 1, which is a block diagram functionally representing the method and system for automated training of manual skills.

Figure 1:
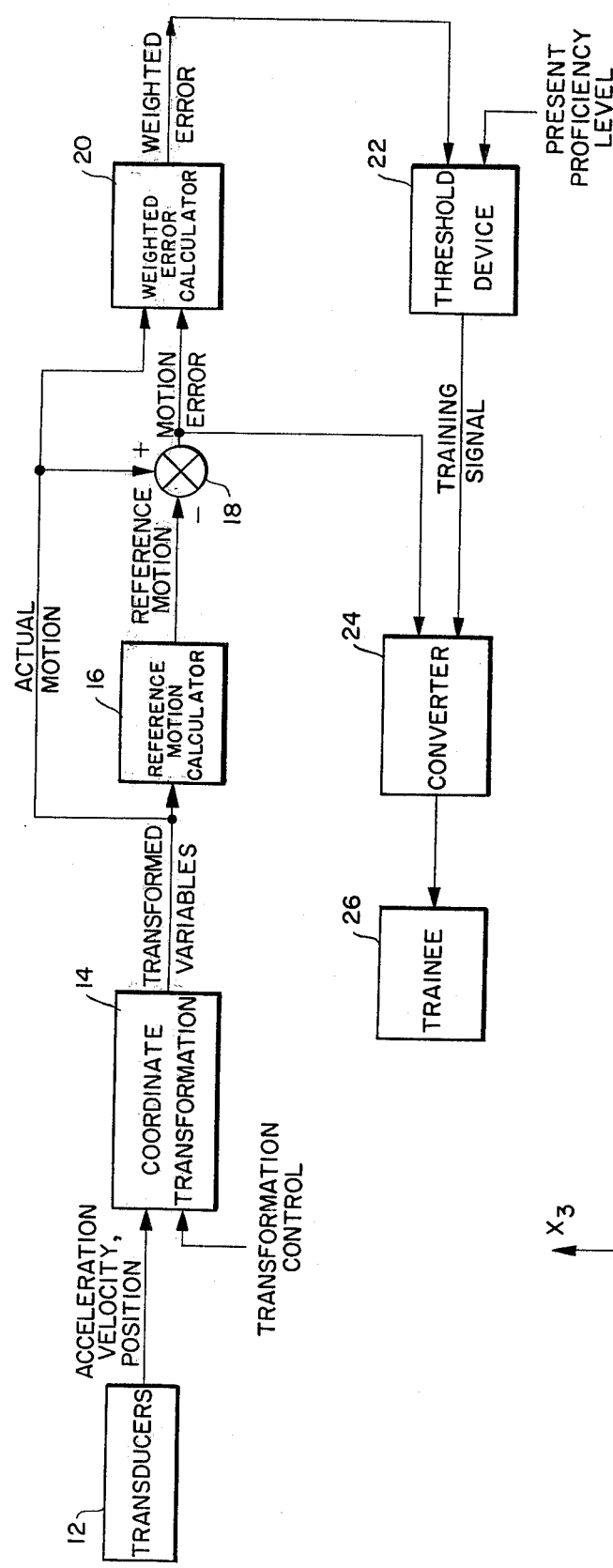
FIG. 1 is a block diagram functionally representing the method and system of the present invention.

As seen in FIG. 1, the method and system for automated training of a subject in manual skills calls for the provision of transducers 12 for providing motion data, a coordinate transformation stage 14 for transforming the motion data, a reference motion calculator 16 responsive to the transformed motion data for deriving reference motion data, a subtractor circuit 18 for deriving motion error data, a weighted error calculator 20 for deriving a weighted error value, a threshold device 22 responsive to the present proficiency level for the subject so as to derive a training signal, a converter 24 for converting the training signal to a form recognizable by the trainee 26.

In operation, transducers 12 measure body motion, in terms of acceleration, velocity and position of lights or sensors located on the subject. Coordinate transformation stage 14 performs a transformation of the motion data from one coordinate system to another. Such coordinate transformation can typically be provided by means of a computer processor operating in accordance with conventional coordinate transformation techniques.

Figure 2:
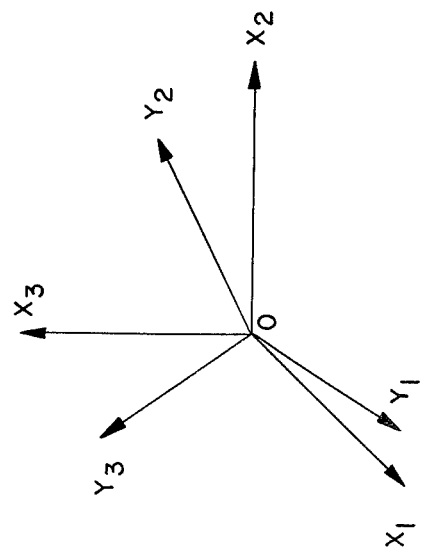
FIG. 2 is a graphical illustration of a coordinate system utilized to describe the technique of the present invention.

For example, with reference to FIG. 2, which is a graphical illustration utilized to describe one coordinate transformation technique, transformation can be carried out in accordance with the following:

(1) System $O—X_1, O—X_2, O—X_3$ is a right handed coordinate system.
(2) System $O—Y_1, O—Y_2, O—Y_3$ is another right handed coordinate system.
(3) $S_{ij}$ is the cosine of the angle between $O—X_i$ and $O—Y_i$ then $$(X)=[S](Y)$$

or $$X_1 = S_{11}Y_1 + S_{12}Y_2 + S_{13}Y_3$$

$$X_2 = S_{21}Y_1 + S_{22}Y_2 + S_{23}Y_3$$

$$X_3 = S_{31}Y_1 + S_{32}Y_2 + S_{33}Y_3$$

The latter convention transformation technique is disclosed in Pipes, L.A., "Matrix Methods for Engineering," New York: Prentice Hall (1963), p. 165.

Returning to FIG. 1, the transformed variables (or motion data) are provided to a reference calculator 16 which derives reference motion data therefrom. More specifically, calculator 16 computes reference motion data from a reference function which is the differential equation (or difference equation, if implemented in digital form) representing the rate of change of each significant variable that, if realized, will lead to the desired task result. The reference function provides an instantaneous reference as a function of present body position. Its value can be determined by a computer solution of a series expansion formula. Formula coefficients are determined from two sources: (1) the initial coefficient values are set from analysis of the task by means of physical laws and control theory; and (2) updated coefficient values are determined empirically by observing the motion sequences that lead to superior performance as compared to motion sequences that lead to less than superior performance for the individual performer. In this way, factors governed by natural laws are first established and then, as the individual demonstrates preferred techniques that are successful, the reference function is modified to reflect those techniques. This method has been applied to development of performance measures empirically (see Connelly et al, "Computer-Aided Generation of Performance Measures for Man-Machine Systems," presented at 18th Annual Meeting of Human Factors Society, Huntsville, Ala. (October 1974).

The significance of the instaneous error function or motion error (i.e., deviation from the instantaneous reference) identified in FIG. 1 can be evaluated by a computer as a function of present error and present state. That is to say, referring to FIG. 1, a weighted error calculator utilizes actual motion data (transformed motion data from coordinate transformation stage 14) and motion error (from the subtractor 18) to derive a weighted error value corresponding to the significance of instantaneous error function or motion error. This function is termed the "system performance measure" (SPM), and is determined by the application of a control theoretic analysis to the manual task. Development of the theory of the SPM is given in Connelly et al, "Continuous Performance Measurement in Flight Systems," presented at 11th Annual Conference on Manual Control, National Aeronautics and Space Administration, Ames Research Center, Moffett Field, California (May, 1975).

The weighted error signal, reflecting the significance of the instantaneous error to performance of the manual task, is directed to a threshold device 22 (FIG. 1). Training signals are presented to the trainee only after the weighted error signal exceeds the threshold, such threshold being inversely related to the proficiency level of the subject. The inventive method does not provide training feedback when performance is below threshold, i.e., for superior, or near reference, performance. The method prevents performer dependency on using training signals as a cue to provide superior component actions. This must be true because, with superior performance, there is no performance feedback. Instead, the training signals are used to learn to use other cues that will be available after training to provide superior performance.

Figure 3:
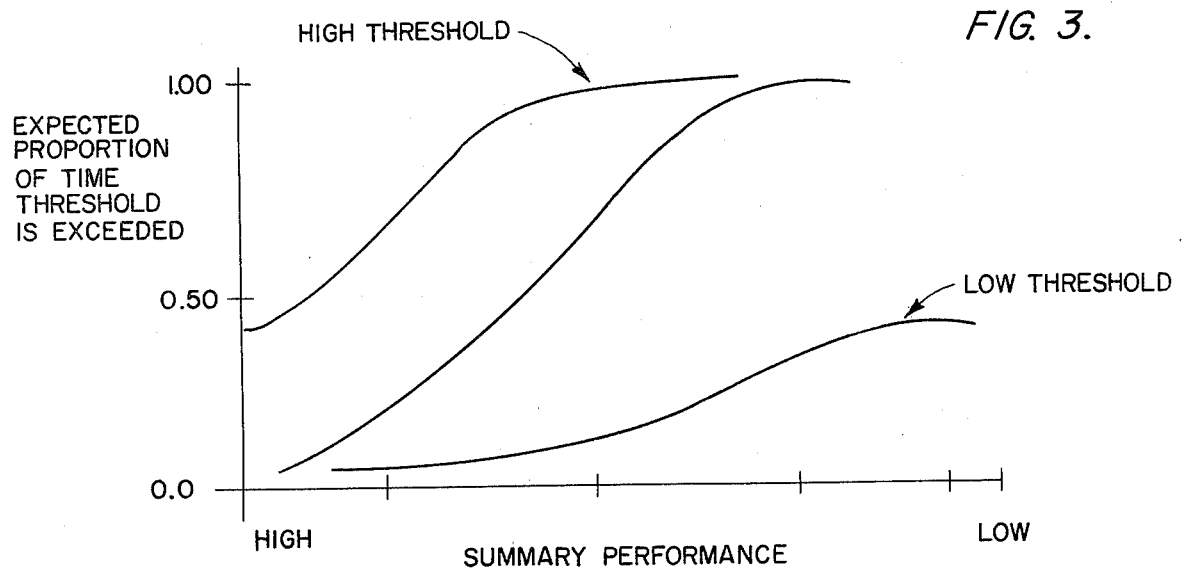
FIG. 3 is a graphical plot pertaining to the expected proportion of time a threshold is exceeded for different levels of summary performance.

In accordance with the present invention, the threshold can be modified to control the amount of training feedback presented to the performer. For a given skill level, there is an expected probability of exceeding a given threshold. Put in a different way, there is a distribution of weighted error (SPM levels) over the task performance as a function of performer skill. The summary performance value is directly related to this distribution since it is the mean of the distribution. Thus, there is an expected proportion of time during which the threshold is exceeded as a function of operator skill and threshold value. FIG. 3 is a graphical plot which illustrates this relationship.

Since the ability of the human performer to accept and use information is limited, the amount of training information supplied to the trainee is modulated to match his capability. This is accomplished by adjusting the threshold to best match the trainee's capability, i.e., to optimize his learning role.

During a training excercise, the weighted error is compared to the threshold in device 22 (FIG. 1). Whenever the threshold is exceeded, a training signal is produced to energize (via converter 24) an audio, tactile or other medium for communicating with the trainee. The feedback signal can take one of several forms, depending on the sophistication and cost of the automated training system. These forms extend from a single binary signal (say an audio tone indicating that at least one of the several body motions exceeds tolerance) to a complex set of tactile vibrations (indicating the specific body motion exceeding tolerance). Both extremes of feedback provide immediate information about serious motion errors. Because of the human being's capability to respond to immediate performance feedback, as demonstrated in biofeedback experiments, the simplest may prove the most cost effective.

Figure 4:
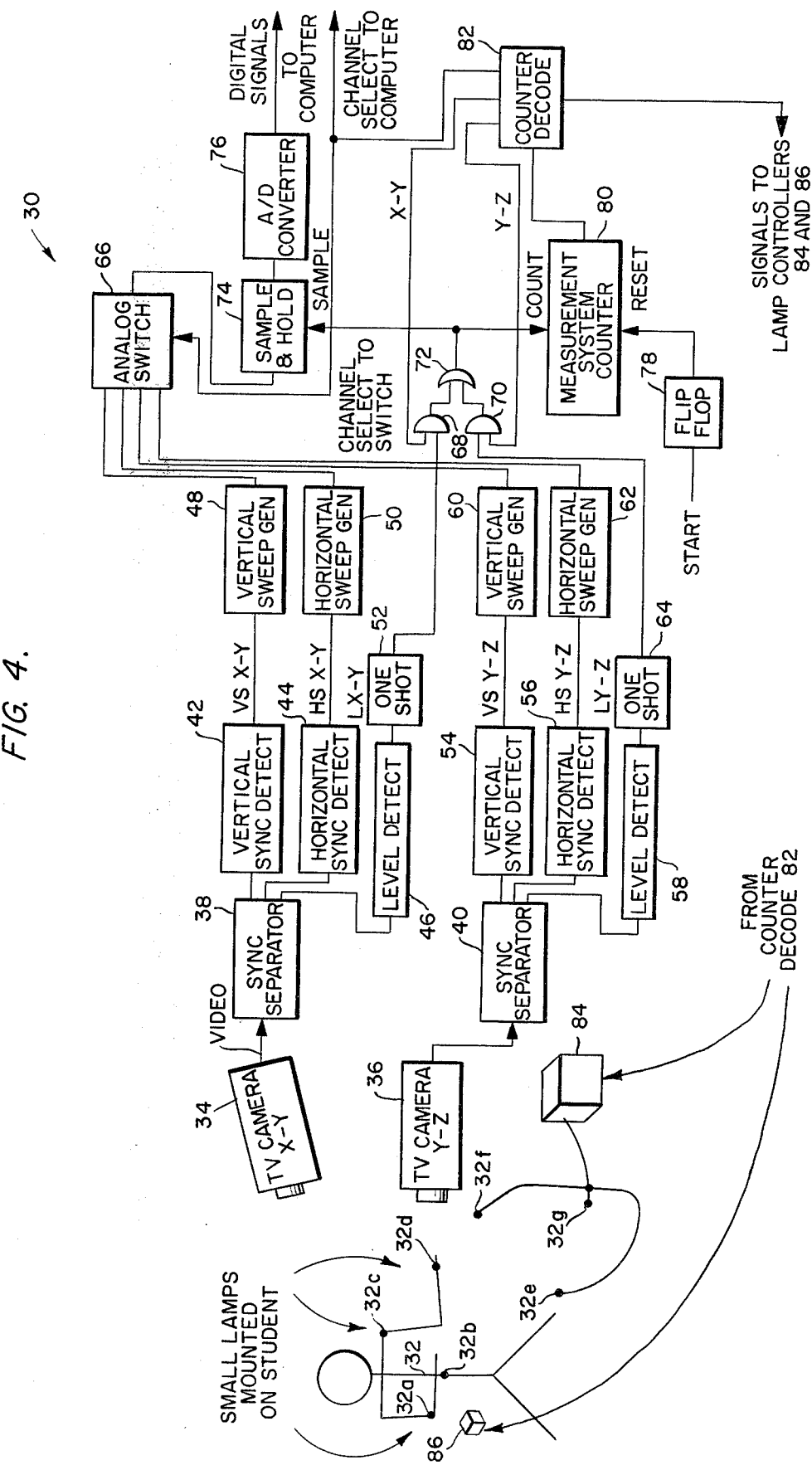
FIG. 4 is a block diagram of a first embodiment of the system of the present invention.

FIG. 4 is a block diagram of the first embodiment of the present invention. As seen therein, the automated training system 30 comprises a subject or trainee 32 having various small lamps 32a–32d mounted on him, accompanied by calibration lamps 32e–32g located in the vicinity of the subject 32; television cameras 34 and 36 for scanning in accordance with the X-Y and Y-Z coordinate systems, respectively; respective sync separators 38 and 40, vertical sync detector circuits 42 and 54, horizontal sync detector circuits 44 and 56, and level detector circuits 46 and 58; respective vertical sweep generators 48 and 60, horizontal sweep generators 50 and 62, and one-shot devices 52 and 64; analog switch 66; logical AND gates 68, 70 and logical OR gate 72; sample-and-hold circuit 74; analog-to-digital converter (ADC) 76; measurement system counter 80 and associated flip-flop 78; and counter decode circuitry 82 and associated calibrating lamp controller 84 and subject lamp controller 86.

In operation, the lamps 32a–32d on the subject 32 are scanned by cameras 34 and 36, respectively. The conventional sweep circuits of the cameras 34 and 36 cause the cameras to be sensitive to light generated by the lamps 32a–32d at a specific time during the sweep as a function of the position in space of each respective lamp. One lamp is energized at a time so that the camera sweep circuits are sensitive to one lamp at a time. The system counter decode circuit 82, to be described in more detail below, energizes each of lamps 32a–32d, as well as reference lamps 32e–32g, in succession so that the position of each lamp can be tracked in succession by the cameras 34 and 36.

Each lamp is sensed by two completely parallel lamp position tracing position systems, comprising cameras 34 and 36, respectively, and associated sync separator, vertical sync detector, horizontal sync detector, etc. circuits corresponding thereto. Since the circuits associated with each of cameras 34 and 36 are identical, operation will be described with respect to camera 34 alone.

The video signal from camera 34 is provided to the sync separator circuit 38, the latter separating the horizontal and vertical sync portions of the video signal from the light level portion of the signal. The separated signals are respectively sent to the vertical sync detector circuit 42, horizontal sync detector circuit 44 and level detector circuit 46. Upon detection of vertical sync, vertical sync detector circuit 42 provides a vertical sync output pulse which is used to trigger vertical sweep generator 48, the latter having a saw tooth wave form output which is initiated by the trigger input thereto, and this provides a linear or near linear voltage slope. It is to be understood that the linear voltage slope of the vertical sweep generator 48 is intended to approximate the position of the vertical sweep of the camera.

Likewise, the horizontal sync detector circuit 44 generates a signal HS X-Y utilized to trigger the horizontal sweep generator 50. Furthermore, level detector circuit 46 provides its output L X-Y to one-shot device 52 which generates a pulse of predetermined duration.

The pulse of one-shot device 52 is provided via AND gate 68 (as enabled by the output X-Y of counter decode circuitry 82 to be described below), and via OR gate 72, as input SAMPLE to sample-and-hold circuit 74, and as input COUNT to measurement system counter 80. Thus, the output pulse of one-shot device 52 is utilized, in a synchronous manner, to command sampling of data by the sample-and-hold circuit 74, and also to command counting of the measurement system counter 80.

Analog switch 66 selectively provides the outputs of vertical sweep generator 48 and horizontal sweep generator 50, or the outputs of vertical sweep generator 60 and horizontal sweep generator 62, to the sample-and-hold circuit 74 in response to a channel select output provided by the counter decode circuitry 82. The signals provided via analog switch 66 are sampled by sample-and-hold circuit 74, converted to digital form by ADC 76, and provided as digital signals to a processor (not shown). The channel select signals from counter decode circuitry 82 are also provided to the processor.

Considering the measurement system counter 80, it is to be noted that a particular lamp, channel and analog switch input are selected and/or energized in accordance with the particular counter state. Table 1 (below) shows the counter function for a five-state counter implementing the measurement system counter 80 of FIG. 4. Such a five-state counter can address each of the eight possible lamps and two TV channels.

TABLE 1

| | | COUNTER FUNCTION | | | | | | | | | | | |
|---|---|---|---|---|---|---|---|---|---|---|---|---|---|
| Counter | | | | | | | | | | Channel | | | |
| State | | | | Lamp | | | | | | X-Y | | Y-Z | |
| | ABCDE | 1 | 2 | 3 | 4 | 5 | 6 | 7 | 8 | V | H | V | H |
| 1 | 0 0 0 0 0 | on | | | | | | | | R | | | |
| 2 | 0 0 0 0 1 | on | | | | | | | | | R | | |
| 3 | 0 0 0 1 0 | on | | | | | | | | | | R | |
| 4 | 0 0 0 1 1 | on | | | | | | | | | | | R |
| 5 | 0 0 1 0 0 | | on | | | | | | | R | | | |
| 6 | 0 0 1 0 1 | | on | | | | | | | | R | | |
| 7 | 0 0 1 1 0 | | on | | | | | | | | | R | |
| 8 | 0 0 1 1 1 | | on | | | | | | | | | | R |

TABLE 1-continued

| Counter State ABCDE | Lamp 1 | 2 | 3 | 4 | 5 | 6 | 7 | 8 | X-Y V | X-Y H | Y-Z V | Y-Z H |
|---|---|---|---|---|---|---|---|---|---|---|---|---|
| 9  01000 | | | on | | | | | | R | | | |
| 10 01001 | | | on | | | | | | | R | | |
| 11 01010 | | | on | | | | | | | | R | |
| 12 01011 | | | on | | | | | | | | | R |
| 13 01100 | | | | on | | | | | R | | | |
| 14 01101 | | | | on | | | | | | R | | |
| 15 01110 | | | | on | | | | | | | R | |
| 16 01111 | | | | on | | | | | | | | R |
| 17 10000 | | | | | on | | | | R | | | |
| 18 10001 | | | | | on | | | | | R | | |
| 19 10010 | | | | | on | | | | | | R | |
| 20 10011 | | | | | on | | | | | | | R |
| 21 10100 | | | | | | on | | | R | | | |
| 22 10101 | | | | | | on | | | | R | | |
| 23 10110 | | | | | | on | | | | | R | |
| 24 10111 | | | | | | on | | | | | | R |
| 25 11000 | | | | | | | on | | R | | | |
| 26 11001 | | | | | | | on | | | R | | |
| 27 11010 | | | | | | | on | | | | R | |
| 28 11011 | | | | | | | on | | | | | R |
| 29 11100 | | | | | | | | on | R | | | |
| 30 11101 | | | | | | | | on | | R | | |
| 31 11110 | | | | | | | | on | | | R | |
| 32 11111 | | | | | | | | on | | | Reset | R |

Lamp Decode:

1 = $\bar{A}\bar{B}\bar{C}$

2 = $\bar{A}\bar{B}C$

3 = $\bar{A}B\bar{C}$

4 = $\bar{A}BC$

5 = $A\bar{B}\bar{C}$

6 = $A\bar{B}C$

7 = $AB\bar{C}$

8 = $ABC$

Channel Decode:
R = READ

X-Y, V = $\bar{D}\bar{E}$

X-Y, H = $\bar{D}E$

Y-Z, V = $D\bar{E}$

Y-Z, H = $DE$

For each counter state, a particular lamp is energized and the position of the lamp is measured (by means of provision of motion data through the two TV channels), as described above. Thus, Table 1 shows the lamp energized and the measurement channel activated with each of the 32 counter states, and also shows the lamp decode and channel select logic associated therewith.

For example, if counter state is 00000, then, according to Table 1, lamp number 1 is energized and the analog switch corresponding to channel X-Y "vertical" is energized as well. This means that analog switch 66 is connected to the vertical sweep generator 48 of channel XY. When the level detect circuit 46 of channel XY detects the light from a lamp, it triggers one-shot device 52, the output of which is directed to associated AND gate 68. Since the counter decode circuitry 82 has selected channel XY, AND gate 68 is enabled to provide the output of one-shot 52, via OR gate 72, to sample-and-hold circuit 74 (as input SAMPLE) and measurement system counter 80 (as input COUNT). Upon receipt of SAMPLE, sample-and-hold circuit 74, which has been tracking voltage from the analog switch 66, holds the voltage and triggers the ADC 76, the latter converting the analog signal to digital form. This digital signal is then transmitted to the processor (not shown).

The signal COUNT triggers the measurement system counter 80 to the next succeeding state, so as to cause the next measurement cycle to occur. In the example, this would be counter state 00001, which state calls for activation of lamp number 1 with channel XY horizontal circuits. Therefore, the horizontal sweep generators circuit 50 would be connected to the analog switch 66 and tracked by the sample-and-hold circuit 74 until the next light level detect pulse arrives. The vertical sync detect circuit 54, horizontal sync detect circuit 56 and level detect circuit 58 associated with the Y-Z camera 36 and sync separator 40 function in a similar manner. Thus, as the measurement system counter 80 is stepped from one state to the next, different lamps 32a–32d and 32e–32g are energized and different TV channels are selected.

With respect to system initiation, it is to be noted that system operation may be commenced by actuation of a START switch which sets flip-flop 78, the latter resetting the measurement system counter 80 to an initial state. It is also to be noted that, during operation, the counter states of counter 80 are decoded by counter decode circuit 82, and the decoder outputs are provided not only to the processor (not shown), the analog switch 66 and the logical AND gates 68 and 70, but also to the subject lamp controller 86 and calibration lamp controller 84, thus causing synchronized activation of various lamps 32a–32d mounted on the subject 32, as well as reference lamps 32e–32g located in the vicinity of the subject 32.

The digital signals provided to the processor (not shown) represent the positions of the lamps which correspond to the positions of the corresponding parts of the body. The processor responds to digital input data to compute motion data (acceleration, velocity and position data) corresponding to the output of transducers 12 shown in FIG. 1, perform coordinate transformation as described above with respect to block 14 of FIG. 1, derive reference motion data as described above with reference to block 16 of FIG. 1, compute motion error and weighted error as described above with reference to subtractor 18 and calculator 20 of FIG. 1, and then perform the threshold computation function described above with reference to device 22 of FIG. 1.

Finally, in accordance with the threshold criteria specified above, a training signal is transmitted, via a converter 24 (FIG. 1), to a trainee 26 whenever the weighted error computation exceeds a predetermined threshold value.

Figure 5:
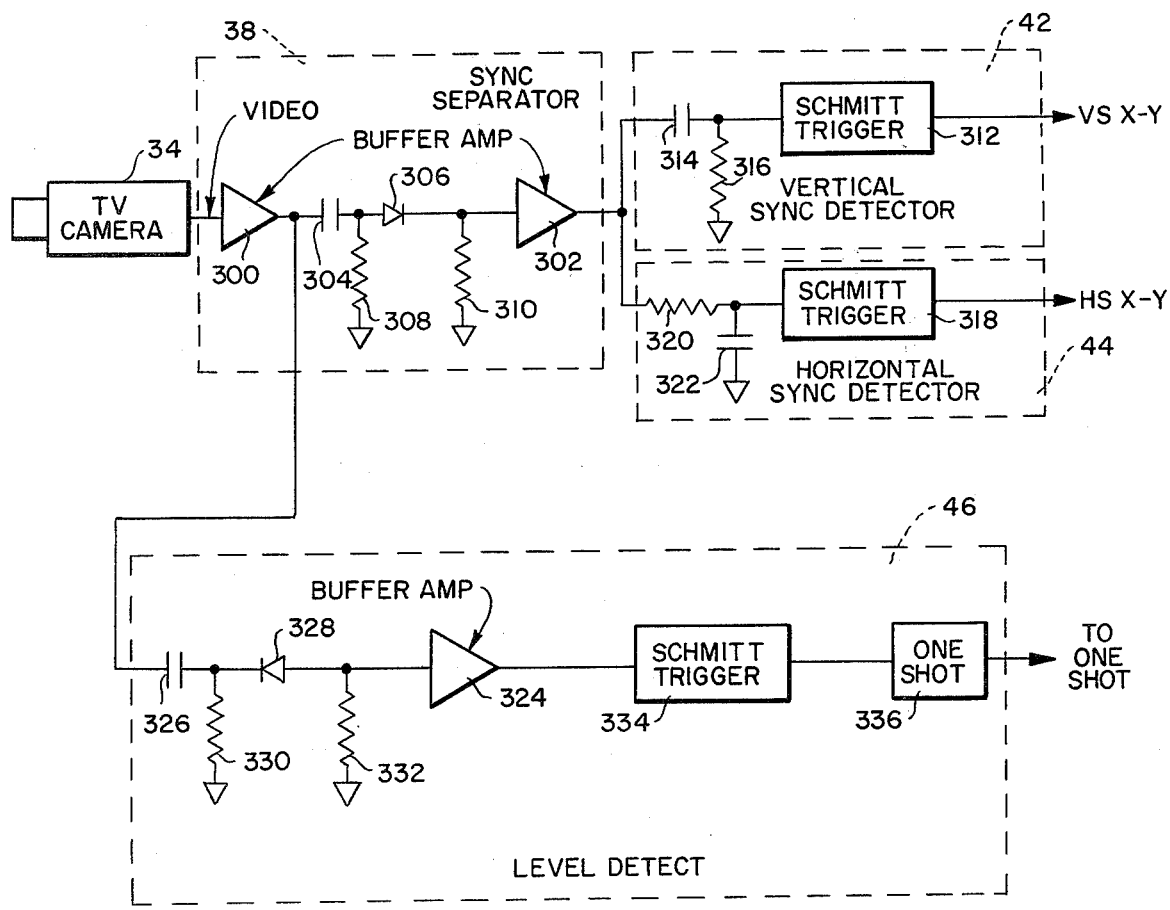
FIG. 5 is a circuit diagram of a portion of the embodiment of FIG. 4.

FIG. 5 is a circuit diagram of a portion of the embodiment of FIG. 4. Specifically, FIG. 5 depicts the camera 34 of FIG. 4, in combination with sync separator 38, vertical sync detector circuit 42, horizontal sync detector circuit 44 and level detector circuit 46.

More specifically, sync separator circuit 38 comprises buffer amplifiers 300 and 302, capacitor 304, diode 306 and resistors 308 and 310, connected as shown. Vertical sync detector 42 comprises Schmitt trigger circuit 312, capacitor 314 and resistor 316 connected as shown, while horizontal sync detector circuit 44 comprises Schmitt trigger circuit 318, resistor 320 and capacitor 322, connected as shown. Finally, level detector 46 comprises buffer amplifier 324, capacitor 326, diode 328, resistors 330 and 332, Schmitt trigger circuit 334 and one-shot device 336, connected as shown.

Inasmuch as the operation of the elements of sync separator 38, vertical sync detector 42, horizontal sync detector 44 and level detector 46 are obvious to those skilled in the art of television technology, operation of these elements will not be set forth here. It is sufficient to state that the detailed arrangements of circuit 38, 42, 44 and 46 comprise standard television circuits which are referenced in many texts, such as *Color Television: Theory and Servicing*, by Clyde N. Herrick (Reston, Virginia: Reston Publishing Company, Inc., second edition). It is to be further noted that RCA and other manufacturers fabricate standard sync separator circuits, sync detector circuits and level detector circuits similar to those shown in FIG. 5, which similar circuits could as well be employed to implement the sync separator 38, vertical sync detector 42, horizontal sync detector 44 and level detector 46, respectively, of FIGS. 4 and 5.

Figure 6:
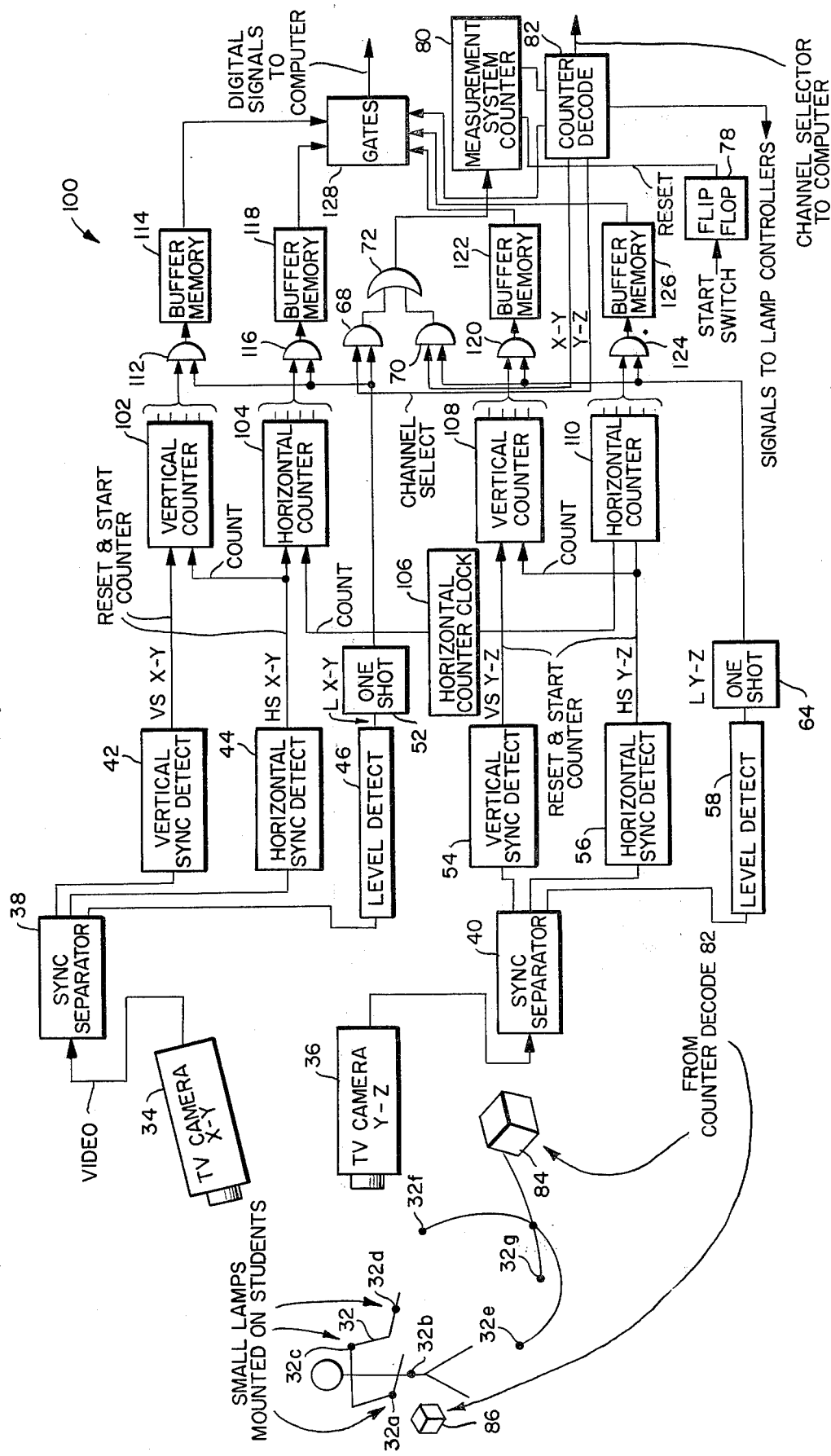
FIG. 6 is a block diagram of a second embodiment of the present invention.

FIG. 6 is a block diagram of a second embodiment of the system of the present invention. As seen therein, the system 100 corresponds in many respects to the system 30 of FIG. 4. Accordingly, identical reference numerals have been utilized where appropriate, and only that portion of the system 100 which differs from the system 30 of FIG. 4 will be described below.

Specifically, the system 100 includes a vertical counter 102 and horizontal counter 104, horizontal counter clock 106, vertical counter 108 and horizontal counter 110, AND gates 112, 116, 120 and 124, buffer memories 114, 118, 122 and 126, and gates 128.

The embodiment of FIG. 6 constitutes an alternative method of measuring the location of the lamps 32a–32d mounted on the subject 32. Specifically, digital counters 102, 104, 108 and 110 are employed in the place of vertical and horizontal sweep generators 48, 50, 60 and 62 of FIG. 4. In the embodiment of FIG. 6, the vertical sync detect circuits 42 and 54 and the horizontal detect circuits 44 and 56 are utilized to reset and start vertical counters 102, 108 and horizontal counters 104, 110, respectively, and, in this manner, the horizontal and vertical positions of the lamps 32a–32d are measured simultaneously. It will be recalled that, in the embodiment of FIG. 4, the horizontal and vertical positions of the lamps were measured in sequence.

In the embodiment of FIG. 6, measurement system counter 80 provides a count value which is decoded by counter decode circuit 82 so as to select a given lamp, as well as the XY or YZ channel. As an illustration, assume that the system counter 80 is in state 0000, the initial state (note that only a 4-bit counter is required for the lamps and the two TV channels in this embodiment of the system). In this state, the first lamp is energized and channel XY is selected. The signals from the decode circuit 82 are provided to the logical AND gates 68 and 70 and to the lamp controllers 84 and 86 as well as to the processor (not shown), as in the embodiment of FIG. 4.

The system 100 then waits for the TV camera to sense light from the lamp. When that occurs, the level detect circuit 46 triggers a pulse output from one-shot device 52, which pulse is directed to logical AND gates 112 and 116.

Considering the operation when the XY channel is selected, sync separator circuit 38 operates by driving vertical sync detector 42, horizontal sync detector 44 and level detector 46. These latter circuits also operate as described above with respect to the embodiment of FIG. 4. Each time the vertical sync detector 42 detects a vertical sync pulse, the vertical counter is reset to its initial position and it starts counting. Since the vertical counter 102 steps in accordance with trigger pulses from the horizontal sync detector 44, the vertical counter 102 is actually counting horizontal lines as they are scanned by the camera 34.

The horizontal sync detector 44 also resets horizontal counter 104, which starts counting at the beginning of each horizontal trace of the camera 34. The horizontal counter steps in accordance with trigger pulses from the horizontal counter clock 106, and counts as the trace sweeps across the camera 34 in the horizontal direction. The resolution and accuracy provided by the system 100 is governed by the count rate of the horizontal counter clock 106. Since the sweep frequency of the conventional TV camera is approximately 15,000 Hz., which allows time for one horizontal sweep of approximately 63 microseconds, resolution of horizontal sweep into 512 parts requires that the horizontal counter clock 106 be approximately 12 megahertz in frequency of operation. This clock frequency can be adjusted to meet the accuracy requirements of the particular measurement system of interest for a specific application within the bandwidth of the video system. Thus, as each vertical and horizontal sync occurs, the associated counters 102, 104, and 108, 110 are reset and started so that they continuously "track" the sweep of the TV cameras 34 and 36, respectively. However, when the level detector 46, 58 detects light from a lamp, it triggers one-shot device 52, 64, which in turn strobes the vertical and horizontal counter (102, 104 and 108, 110) states into the buffer memories 114, 118 and 122, 126, respectively, via the AND gates, 112, 116 and 120, 124, respectively. Finally, gates 128 are employed to transfer data from the buffer memories 114, 118 and 122, 126 to the processor (not shown), the gates 128 being controlled by counter decode circuitry 82. It is also to be noted that a trigger pulse from one-shot device 52, 64, passes through logical AND gates 68, 70 and OR gate 72, so as to trigger the measurement system counter 80 to the next count state.

FIG. 7 is a block diagram of a third embodiment of the system of the present invention. As seen therein, the system 200 comprises a system clock 202, a system counter 204, a system control 206, data counter clock 208, level detector reference sensor 210, data counter 212, level detector sensors 214a through 214n, AND gates 216a through 216n, data buffers 218a through 218n, and control gates 220. Also included in the system 200 are rotating cylinders 222a through 222c, photosensors 224a through 224n mounted on the student 32, and a reference photosensor 226.

The system 200 employs an alternative method of sensing the position of the body of the student 32, and does not employ TV cameras as in the embodiment of FIGS. 4 and 6. Rather, the system 200 of FIG. 7 employs a technique involving moving light beams generated by the rotating cylinders 222a through 222c, which light beams are detected by photosensors 224a through 224n mounted on the subject 32 as well as the reference photosensor 226. The measurement concept for technique employed by the system 200 in FIG. 7 is as follows.

A rotating cylinder 222a, 222b, or 222c has a lamp (not shown) mounted along its long axis, and a slit (also not shown) positioned along its periphery. Thus, the rotating cylinders 222a through 222c rotate and project a rotating plane of light extending from the cylinder as rotation takes place. As the beam of light impinges on any one of the photosensors 224a through 224n or 226, the time of that impingement fixes the position of the plane of the light beam as passing through the center line of the rotating cylinder and the photosensor. Now, if a second plane of light from another cylinder mounted orthogonally to the first cylinder is rotated, and its plane is fixed when its light impinges on the same photosensor, a second plane is established, which econd plane passes through the center line of the second rotating cylinder and also the point of the photosensor. The intersection of these two planes is a line which passes through the photosensor. Now, consider a third rotating cylinder mounted orthogonally to the other two. When its plane of light impinges on the photosensor, the position of the third plane is fixed. The intersection of the three planes defines a unique point which is the location of the photosensor. Thus, knowledge of the position of the three planes uniquely defines the position of the photosensor in space.

The position of the rotating cylinder light planes can be defined relative to a fixed photosensor (reference photosensor 26 shown in FIG. 7). As the light beam from one rotating cylinder impinges on the fixed sensor, as detected by level detector reference sensor 210, data counter 212 is reset and starts counting. Correspondingly, when the plane of light impinges on one of the subject photosensors (for example, sensor 224a), as detected by a corresponding level detector subject sensor 214a, AND gate 216a is enabled to provide the count value of counter 212 to data buffer 218a. The counter state thus recorded in buffer 218a is proportionate to the angle through which the light beam has travelled by the time it impinged on the fixed reference-photosensor 226 and the time it impinged on the subject-mounted photosensor 224a.

The system 200 of FIG. 7 implements this measurement technique in accordance with the provision of multiple photosensors 224a through 224n mounted on a subject, these photosensors being connected via a cable 228 to corresponding level detector subject sensors 214a through 214n. A fixed reference photosensor 226 is also mounted in the vicinity of the subject 32, and is connected to level detector reference sensor 210 via cable 230. Three rotating cylinders 222a through 222c are positioned in orthogonal relationship, and are controlled, as to their rotation, by a system controller 206, the latter being in turn driven by system counter 204, as actuated by system clock 202.

Operation of the system 200 is as follows. When the system clock 202 is energized, by actuation of the on switch/off switch (not shown), the system counter 204 is caused to step through its various count states, such count states being decoded by system control 206. Table 2 (below) shows the states of system counter 204, in combination with the various activities which take place during each count state. For state 01, the lamp in rotating cylinder 222a is actuated. In state 10, the lamp in cylinder 222a is turned off and the lamp in cylinder 222b is turned on. Finally, in state 11, the lamps in cylinders 222a and 222b are turned off and the lamp in cylinder 222c is turned on. The sequence is repeated continuously. It is to be understood that the system control 206 can be any combination of logical elements which implements the operations described in Table 2, implementation of such operations being considered obvious to those with skill in the art.

Further describing the operation of system 200, as each lamp in a rotating cylinder is energized, it first illuminates the reference photosensor 226, and then in turn illuminates each of the subject-mounted photosensors 224a through 224n. When the reference photosensor 226 is illuminated, it triggers level detector reference sensor circuit 210, causing reset of data counter 212, which then starts its counting operation. It is to be noted that the rate at which the data counter 212 counts determines the resolution and accuracy of the system, such rate of counting being determined by the clock frequency of data counter clock 208.

TABLE 2

| | SYSTEM COUNTER STATES | | | |
|---|---|---|---|---|
| | | Rotating Cylinder, Lamp# | | |
| Count | System Counter State | 222a | 222b | 222c |
| 1 | 01 | on | | |
| 2 | 10 | | on | |
| 3 | 11 | | | on |
| Return to Count 1 | | | | |

As each photosensor 224a through 224n mounted on the subject is illuminated, the illumination is detected by an associated one of the level detectors student sensors 214a through 214n. Upon detection of illumination, each level detector student sensor 214a through 214n enables a corresponding AND gate 216a through 216n, so as to pass the contents of data counter 212 to a corresponding data buffer 218a through 218n. When all the data buffers 218a through 218n have been loaded with the data, control gates 220 are actuated by a gate control signal from the processor (not shown), and pass the data stored in buffers 218a through 218n to the processor.

As stated above, the contents of the data counter 212, as stored in the buffers 218a through 218n and then provided to the processor (not shown), correspond to the angle through which the light beam from the various rotating cylinders 222a through 222c passes between the reference photosensor 226 and the first subject-mounted photosensor 224a, between the first sensor 224a and the second sensor 224b, and so on. The processor receives and processes this data, in accordance with techniques which would be obvious to those skilled in geometry and mathematics, to compute motion data (acceleration, velocity and position), relating to movement of the subject 32 in performance of the particular manual skill. Then, the processor performs the various other functions (coordinate transformation, reference calculation, etc.), discussed above with reference to FIG. 1, as well as the other embodiments (FIGS. 4 and 6) of the present invention. As a result of such computations and operations, the processor (not shown) determines whether or not the weighted error value associated with the performance of the subject 32 exceeds a predetermined threshold, and, if so, a training signal is sent, via an appropriate converter 24 (FIG. 1), to the trainee 26 (subject 32).

While preferred forms and arrangements have been shown in illustrating the invention, it is to be clearly understood that various changes in detail and arrangement may be made without departing from the spirit and scope of this disclosure.

What is claimed is:

1. A method for automated training of a subject having a given proficiency in manual skills, comprising the steps of:
    (a) measuring body motion so as to derive a set of motion variables,
    (b) comparing said motion variables to a reference motion to derive a motion error value,
    (c) comparing said motion error value to a threshold error value corresponding inversely to said given proficiency level of said subject, and
    (d) providing a training signal to said subject whenever said motion error value exceeds said threshold error value.

2. The method of claim 1, comprising the additional step, between steps (b) and (c), of weighting said motion error value in accordance with actual body motion of said subject, as indicated by said set of motion variables.

3. The method of claim 1, comprising the additional step, between steps (a) and (b), of transforming said set of motion variables in accordance with a given coordinate system to a set of transformed motion variables, wherein step (b) comprises comparing said transformed motion variables to said reference motion.

4. The method of claim 1, comprising the additional step (e) of decreasing said threshold error value used in step (c) as the proficiency level of the subject increases.

5. A system for automated training of a subject having a given proficiency in manual skills, comprising:
    measuring means for measuring body motion so as to derive a set of motion variables,
    comparing means for comparing said motion variables to a reference motion to derive a motion error value,
    additional comparing means for comparing said motion error value to a threshold error value corresponding inversely to said given proficiency level of said subject, and
    providing means for providing a training signal to said subject whenever said motion error value exceeds said threshold error value.

6. The system of claim 5, further comprising weighting means for weighting said motion error value in accordance with actual body motion of said subject, as indicated by said set of motion variables.

7. The system of claim 5, further comprising transforming means for transforming said set of motion variables in accordance with a given coordinate system to a set of transformed motion variables, and wherein said comparing means compares said transformed motion variables to said reference motion.

8. A system for automated training of a subject in manual skills, comprising:
    at least one lamp mounted on said subject and actuable to a lighted condition;
    first camera means for scanning said subject in accordance with a first reference system to develop first motion data relevant to said first reference system;
    second camera means for scanning said subject in accordance with a second reference system to develop second motion data relevant to said second reference system;
    selection means for alternatively selecting said first motion data and said second motion data, respectively;
    processing means for processing said selected first and second motion data to determine a system performance measure of said subject, which compares said subject performance to a performance measure standard to develop a variation therebetween; and
    training signal means responsive to a preset threshold level for sending a training signal to said subject when said variation exceeds said present threshold level.

9. The system of claim 8, wherein said first and second motion data comprise analog signals, said selection means comprising an analog switch for selecting said analog signals comprising said first and second motion data, and converting means for converting said selected analog signals to digital form.

10. The system of claim 8, comprising first and second counter means responsive to said first and second motion data, respectively, for counting to develop first and second digital data, respectively, corresponding thereto, said selection means comprising logical gate circuitry for selecting said first and second digital data, and for providing said selected first and second digital data to said processing means.

11. The system of claim 8, comprising at least one reference light, mounted in the vicinity of said subject, and calibration means for automatically and periodically calibrating said system by automatically and periodically lighting said at least one reference light.

12. The system of claim 8, wherein said at least one lamp comprises a plurality of lamps, each corresponding to a respective reference coordinate system.

13. A system for automated training of a subject in manual skills, comprising:

a plurality of light sources;

control means for controlling said plurality of light sources to provide moving light beams;

sensor means comprising at least one sensor mounted on said subject for detecting said moving light beams and producing a sensor output in correspondence thereto;

processor means for processing said sensor output to determine a position of said at least one sensor in space, and thus to determine motion data comprising a system performance measure for said subject which compares subject performance to a performance measure standard to develop a variation therebetween; and training signal means responsive to a preset threshold level for sending a training signal to said subject whenever said variation exceeds said preset threshold level.

14. The system of claim 13, wherein said plurality of light sources comprise three orthogonally disposed rotating cylinders with lamps contained therein.

15. The system of claim 13, said at least one sensor comprising a plurality of sensors, said system including selection means for selecting said sensor output of each of said plurality of sensors in sequence, and for providing said selected sensor outputs to said processor means.